United States Patent Office 3,429,691
Patented Feb. 25, 1969

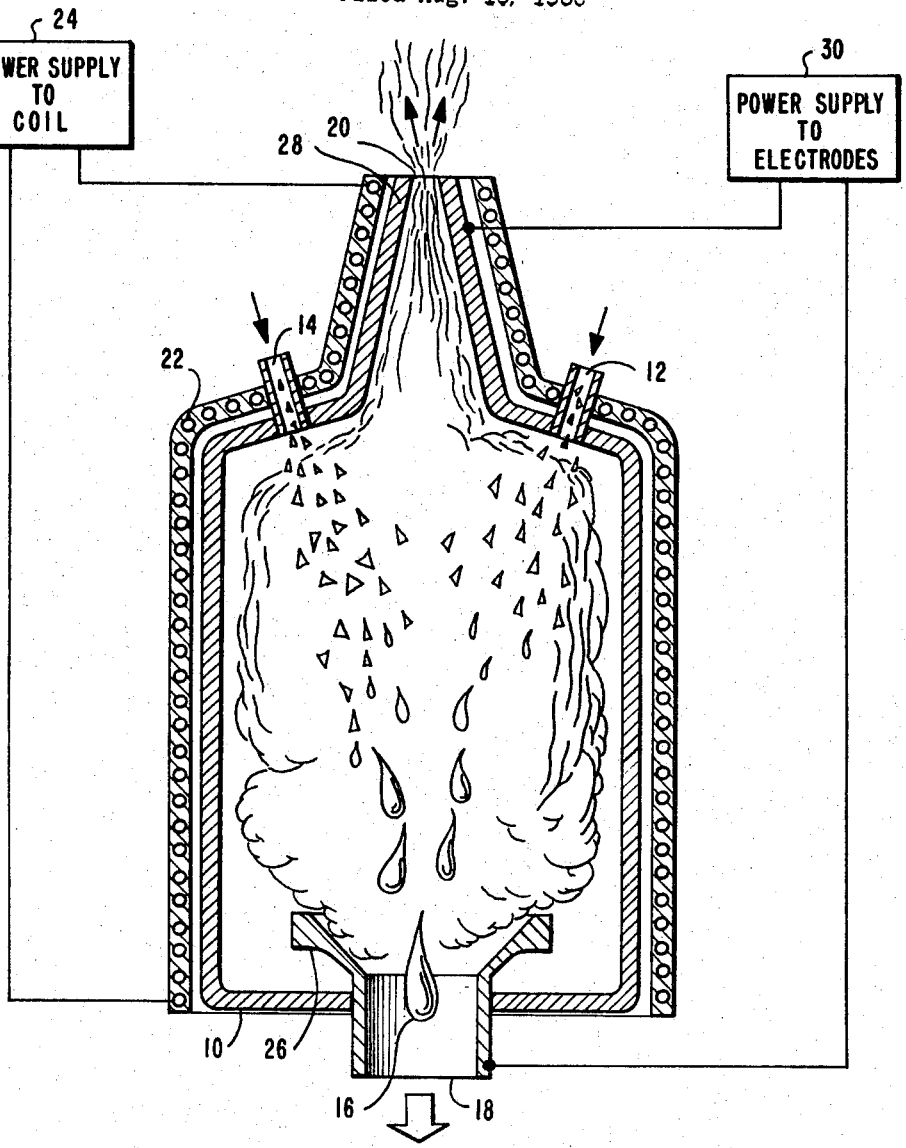

3,429,691
PLASMA REDUCTION OF TITANIUM DIOXIDE
William J. McLaughlin, Claremont, Calif., assignor to Aerojet-General Corporation, El Monte, Calif., a corporation of Ohio
Filed Aug. 19, 1966, Ser. No. 573,526
U.S. Cl. 75—10   10 Claims
Int. Cl. C22b 53/00; C22d 7/04

ABSTRACT OF THE DISCLOSURE

A method to reduce titanium dioxide powder to elemental titanium by introducing the said oxide powder into a plasma chamber wherein the oxide powder is melted into finely divided liquid droplets. The hydrogen plasma which is in countercurrent flow to the oxide droplets reduces the liquid oxide to elemental titanium by oxygen exchange from the titanium oxide to react with hydrogen to from water vapor or steam. The steam is evolved as a by-product and the liquid titanium is recovered as finely divided droplets.

---

This invention relates to a novel method for the preparation of elemental titanium by reduction of titanium dioxide.

Titanium has several advantages over other structural metals such as aluminium and steel. These advantages include high strength-to-weight ratio, the maintenance of high strength at elevated temperatures up to about 1100° F., and corrosion resistance in air up to about 1100° F. Titanium in chemically combined form is widely available throughout the world and commonly occurs in the form of ores such as ilmenite and/or rutile. There are two basic processes currently used for the commercial production of titanium:

(1) The Kroll process;
(2) The iodide decomposition process.

The latter involves the decomposition of the iodine and the deposition of extremely pure titanium from vapor. It is, however, quite expensive and not applicable to large scale production. The Kroll process involves passing a mixture of titanium dioxide and carbon into a chlorinator to produce titanium tetrachloride which is then purified in a still. The titanium tetrachloride is then reduced in an inert atmosphere by magnesium to yield titanium, magnesium chloride, and excess magnesium. After comminution to small pieces, the magnesium chloride and magnesium are then removed by leaching or vacuum distillation. The titanium residue is then pressed, sintered and compacted into ingots. However, titanium is still limited in use owing to the high cost of production involved in the practice of the two processes outlined above. However, many applications now exist where titanium could be advantageously used, including turbine engines for automobiles, power plants, and airplanes, as well as structural applications in aircraft, submarines, missiles and spacecraft. Therefore, there exists a critical need for a process of preparing elemental titanium in a more efficient and economic way.

Thus, it is a principal object of the present invention to provide a novel process for the preparation of elemental titanium whereby the cost is substantially reduced.

More particularly, it is an object of the present invention to provide a novel plasma reduction process for the conversion of titanium dioxide to free titanium.

Specifically, it is an object of the present invention to obtain titanium from titanium dioxide by passing powdered titanium dioxide into a plasma generator which uses hydrogen as the working fluid and recovering free titanium in a counter-current process.

These and other objects and advantages of the invention will become apparent from the more detailed description which follows, taken in conjunction with the accompanying drawing.

Briefly, the present invention comprises the reduction of titanium dioxide to titanium by hydrogen plasma and is accomplished by passing finely divided titanium dioxide counter-currently through the plasma and collecting the titanium metal in the liquid phase.

The basic overall chemical reaction involved in my invention is:

$$TiO_2(L) + 2H_2(G) \rightarrow Ti(L) + 2H_2O(G)$$

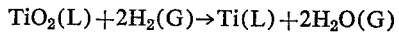

high strength at elevated temperatures up to about 1100 wherein the parenthetical terms indicate the state of the reactants and products as either liquids or gases. As the equation indicates, the reaction normally involves the reaction of liquid titanium dioxide with gaseous hydrogen plasma to yield the elemental titanium in liquid form, usually droplets, with steam being generated as a by-product. As will be understood by those skilled in the art, the above equation does not reflect all of the reactions taking place in the reduction process since significant amounts of atomic hydrogen are normally present in any plasma.

In order for the reaction to go to completion, the process is generally conducted at a temperature of from about 2500° K. to about 3540° K. The counter-current of the flow pattern can be maintained by regulation of the plasm velocity. In general, the plasma velocity required for counter-current operation is extremely low and is regulated by the use of restricting magnetic fields or induction. The plasma generator per se does not form a part of this invention, and the required plasma may be furnished by any of the various plasma generators already known to those skilled in the art, including arc jets, electric arcs, plasma jets, or induction plasma generators.

The flow of the titanium and titanium dioxide is maintained counter-current to that of the hydrogen plasma, oxygen and water vapor, in order to prevent the reversal of the reaction upon cooling of the ingredients. The dwell time of the titanium dioxide in the hydrogen plasma is generally sufficient to permit complete reaction of the particles present. Preferably, the produced titanium is cooled in an environment free of oxygen and nitrogen in order to prevent undesirable contamination of the product.

Due to the severe effects of minute amount of oxygen in the final product, the reaction must be driven essentially to completion. The process is operated with stoichiometric excess of hydrogen plasma since its contamination of the titanium is readily correctable by standard vacuum heating techniques.

The purpose of the hydrogen plasma is threefold: (1) to heat the titanium dioxide to approximately 3300° K.; (2) to remove the oxygen from the titanium by reduction; and (3) to remove water and excess hydrogen from the reaction chamber. In order to permit complete reaction of the oxide the longest possible dwell times must be attained for the liquid particles in the hydrogen. This requires an extremely low velocity plasma having initial temperature of approximately 14,000° K. A low velocity plasma is also required in order to permit the counter-current flow of the material in the liquid and plasma phases. The highest temperature of the titanium droplets for optimum results is below 3540° K. in order to prevent vaporization. From basic concepts, those skilled in the art will recognize that since the velocity of the plasma is equal to the square root of twice the enthalpy difference, the enthalpy gradient through the plasma generator must be low enough to permit the liquid titanium dioxide and titanium to fall slowly through the plasma without being blown out of the reaction chamber. In the case of an arc jet, a magnetic field must be applied to restrict plasma flow and to contain the plasma away from the metallic walls of the container. In an induction plasma generator, use of a restricting magnetic field is part of the basic operation of the unit. For either process the conditions of temperature and velocity will require a hydrogen plasma of approximately 14,000° K., an enthalpy of 138,000 Kcal./mole, and a velocity less than 18 m./sec., commonly as low as 0.3 m./sec. or less.

Normally the entire system is maintained in a strong magnetic field and arcs prevent melting of the generator. The titanium produced is preferably after-treated to remove excess hydrogen. This may be conveniently accomplished by prolonged heating in a vacuum oven at a temperature above about 870° K.

The following example is presented solely to illustrate the invention and should not be regarded as limiting in any way. In the examples, the parts and percentages are by weight unless otherwise indicated.

Example

A Giannini P-140 plasma jet was utilized in the following run. This unit does not have the capability of operating with hydrogen alone as the primary working fluid. To overcome this, the plasma jet was started with helium and hydrogen was later blended with helium for the purpose of producing titanium. Batches of titanium dioxide paint pigment, obtained from Du Pont, were packed into a hollow graphite cylinder until eighteen grams of the titanium dioxide were present. The plasmas consisting of helium and hydrogen were allowed to impinge normally upon the flat end of the graphite cylinder. The specimen was heated to a brightness temperature of approximately 3100° K., and maintained at that temperature for approximately 15 seconds. The distance from the end of the front electrode of the plasma jet to the sample was approximately three inches. At the conclusion of the heating period, the power was turned off in the plasma jet and the hydrogen was turned off, leaving the specimen to cool slowly in a bath of flowing helium gas. Even though the titanium dioxide remains stationary during the tests, its relative velocity to the hydrogen-helium plasma was approximately 8,000 feet per second, thus providing for the counter-current flow requirement. The hydrogen flow rate was approximately $100 \times 10^{-4}$ pounds per second, the helium flow rate was approximately $9 \times 10^{-4}$ pounds per second, and the power level was 70 kilowatts. The titanium produced in the graphite cylinder was removed and analyzed. The results of the analyses were as follows:

| Constituents: | Concentration, percent |
|---|---|
| Titanium | 99.8 |
| Aluminum | 0.1 |
| Copper | Trace |

Another preferred way of practicing the present invention is shown in the accompanying drawing. The drawing shows a plasma generator body 10 in cross-section. The solid particulate titanium dioxide is introduced through feed ports 12 and 14. The titanium dioxide liquefies inside body 10 and is reduced by the plasma to yield liquid elemental titanium droplets 16 at exit port 18. The exit port for the plasma and gas vapor, mostly steam, is at 20. The coil 22 produces the desired compressing magnetic field which prevents the extremely hot contents of body 10 from melting the generator. The coil 22 is powered by power supply 24. The internal power for plasma generation is furnished by the titanium electrodes 26 and 28 activated by power supply 30. The hydrogen may be introduced via port 18, through orifices around port 18, or at any other convenient location adapted to maintain the necessary counter-current flow. This embodiment is particularly adapted to the production of titanium from titanium dioxide on a continuous basis.

As will be immediately apparent to those skilled in the art, the foregoing process for the production of titanium provides substantial economies in the preparation of a metal of increased commercial application. It will also be understood that the invention is not limited to the particular apparatus depicted, but that the invention is applicable to the reduction of titanium dioxide using hydrogen plasmas generated by any source. The essence of the invention is the reduction of the liquid titanium dioxide by the counter-current flow contact therewith of atomic hydrogen plasmas.

Having fully described the invention, it is intended that it be limited only by the lawful scope of the appended claims.

I claim:
1. A method for the production of elemental titanium which comprises reducing finely divided liquid titanium dioxide with hydrogen plasma in counter-current flow and recovering the titanium produced in the liquid state.
2. The method of claim 1 wherein the reduction is carried out at a temperature from about 2500 to about 3540° K.
3. The method of claim 1 wherein the hydrogen plasma is generated in a plasma arc jet.
4. The method of claim 1 wherein the titanium dioxide is introduced in the form of a finely divided powder which is subsequently converted to a finely divided liquid by contact with said hydrogen plasma.
5. The method of claim 1 wherein the titanium is recovered as finely divided droplets.
6. The method of claim 1 wherein the titanium produced is subsequently after-treated to remove entrained contaminants.
7. The method of claim 1 wherein the titanium produced is subsequently after-treated to remove entrained contaminates by heating under vacuum at a temperature above about 870° K.
8. The method of claim 1 wherein the plasma velocity is less than about 18 m./sec.
9. A method for the production of elemental titanium which comprises establishing a reaction zone, introducing into said zone particulate solid titanium dioxide, introducing hydrogen plasma counter-currently to said solid titanium doxide to liquefy and reduce same while maintaining said zone in a compressing magnetic field to prevent the contents of the zone from contacting the sides thereof and collecting particulate titanium liquid from said zone at a point remote from the point of introduction of said solid titanium dioxide.
10. A method for the continuous production of elemental titanium which comprises establishing a reaction zone, introducing into said zone particulate solid titanium dioxide, introducing hydrogen plasma counter-currently to said solid titanium dioxide to liquefy and reduce same while maintaining said zone in a compressing magnetic field to prevent the contents of the zone from contacting the sides thereof, operating said zone at a temperature of from about 2500 to 3540° K., and collecting particulate titanium liquid from said zone at a point remote from the point of introduction of said solid titanium dioxide.

References Cited

UNITED STATES PATENTS

| | | | |
|---|---|---|---|
| 3,004,137 | 10/1961 | Karlovitz | 75—11 X |
| 3,123,464 | 3/1964 | Casey et al. | 75—10 |
| 3,136,622 | 6/1964 | Pratt | 75—11 X |
| 3,149,222 | 9/1964 | Giannini et al. | 219—75 X |
| 3,226,223 | 12/1965 | Bussard et al. | 75—10 |
| 3,230,073 | 1/1966 | Ericsson | 75—10 |
| 3,232,746 | 2/1966 | Karlovitz | 75—10 |
| 3,257,196 | 6/1966 | Foex | 75—10 |
| 3,279,912 | 10/1966 | Death et al. | 75—10 |
| 3,286,012 | 11/1966 | Foex | 75—10 X |

OTHER REFERENCES

Tyler, Paul M.: Plasma for Extractive Metallurgy, Journal of Metals, January 1961, pp. 51–54.

L. DEWAYNE RUTLEDGE, *Primary Examiner.*

J. E. LEGRU, *Assistant Examiner.*

U.S. Cl. X.R.

13—31; 75—11, 65, 84; 219—131